2,884,845

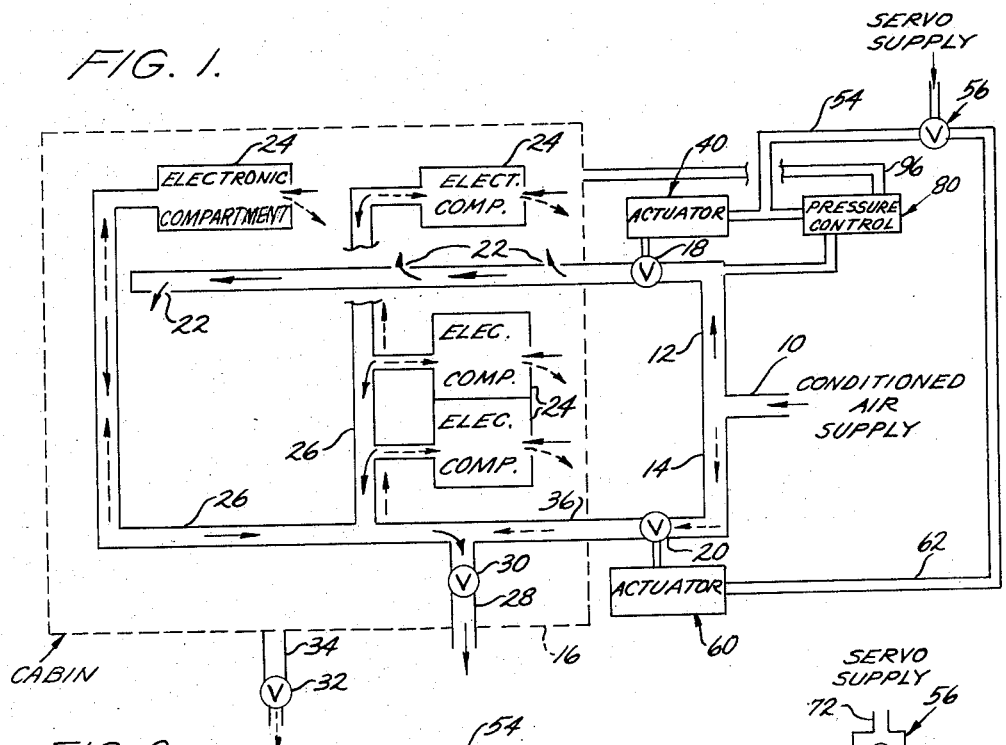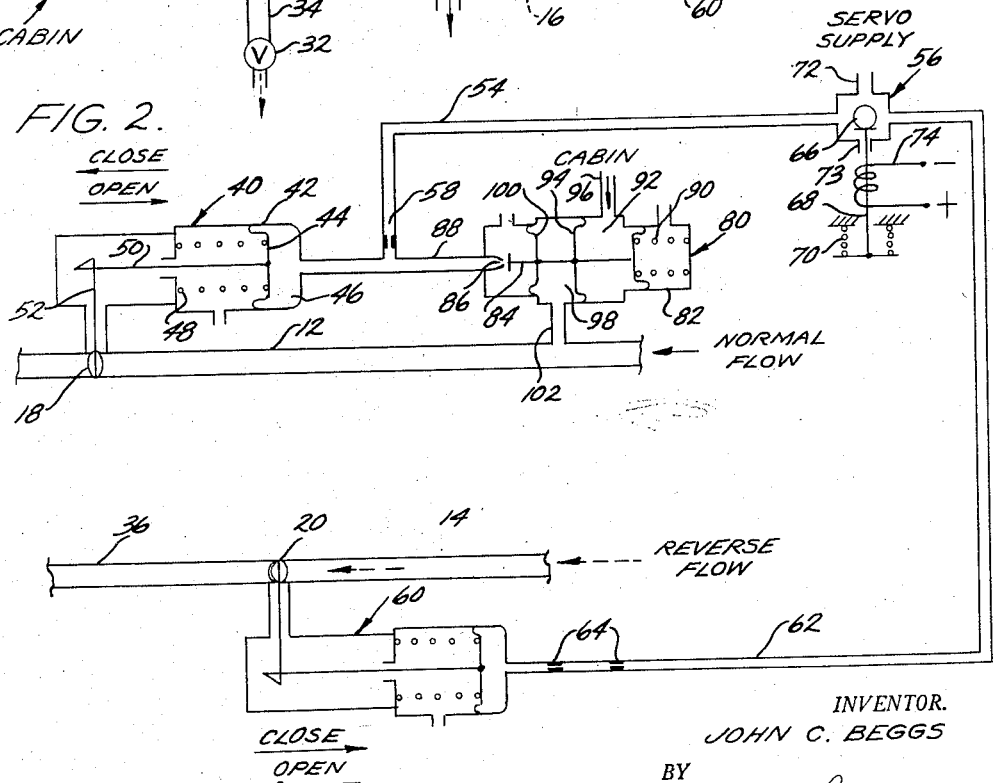

VALVE MEANS FOR CONTROLLING DIRECTION OF FLOW IN AN AIRCRAFT AIR CONDITIONING SYSTEM

John C. Beggs, Manchester, Conn., assignor to United Aircraft Corporation, East Hartford, Conn., a corporation of Delaware Application July 15, 1957, Serial No. 672,089

6 Claims. (Cl. 98—1.5)

This invention relates to an aircraft air conditioning system and, more specifically, to a pair of valves which are coordinated to control the direction of flow in an air conditioning system. The valves are particularly adapted for use in a system of the type shown and described in the application of Stanley G. Best, Serial No. 656,091, filed April 30, 1957, entitled "Recirculating Flow Aircraft Air Conditioning System."

It is the general object of the present invention to provide in an air conditioning system of a type capable of flow in one direction and in a reverse direction, improved means for controlling the direction of flow and for changing the direction of flow without causing ill effects which might be expected to result when a change is made in the direction of flow.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing,

Fig. 1 is a schematic view of an aircraft air conditioning system wherein the direction of flow may be reversed and which incorporates the control valves of this invention; and Fig. 2 is a further schematic view showing the co-ordinated valves in greater detail and also showing the control means therefor.

The air conditioning system shown in Fig. 1 includes a main supply conduit 10 which is connectible with a source of air under pressure. The air supply has been refrigerated or otherwise conditioned before reaching the conduit 10. Since the construction and operation of the pressurized air source and the refrigerating elements form no part of the present invention, they have not been shown. The supply conduit 10 is connected with two cabin inlet conduits 12 and 14, both of which extend into the aircraft cabin 16. The conduit 12 may be referred to as the normal inlet conduit and the conduit 14 may be referred to as the reverse flow inlet conduit for the cabin. In accordance with the present invention, a valve 18 is located in the cabin inlet conduit 12 and is normally open and a valve 20 is located in the reverse flow inlet conduit 14 and is normally closed. The normal flow path for the air being supplied to the cabin is through the inlet conduit 12, the valve 18 being open, but the valve 18 can be closed and the valve 20 opened to accommodate flow to the cabin through the inlet conduit 14. In either direction of flow, the air is passed in series through a plurality of compartments including the cabin.

The air supply normally is introduced to the cabin 16 from the inlet conduit 12 through a plurality of openings 22, 22. The cabin is normally maintained under pressure whereby to force the air through a plurality of electronic compartments disposed within the cabin 16 and indicated generally by the reference 24, 24. The normal flow path for the air supply is indicated in Fig. 1 by the full line arrows, and it will be noted that the air forced through the electronic compartments 24, 24 flows into air discharge conduit means or a discharge manifold indicated generally by the reference numeral 26. An outlet conduit 28 is connected with the discharge manifold 26 and has a valve 30 disposed therein. The valve 30 is of the type which opens automatically to discharge air when the pressure on the upstream side of the said valve reaches a predetermined level. Thus, the valve 30 functions as a pressure regulating valve for the aircraft cabin 16 and for the various electronic compartments 24, 24. An additional valve 32 is provided in a cabin passage 34 to dump air from the cabin 16 if the pressure therein reaches a predetermined level greater than the air pressure at which the regulating valve 30 is set to open. The valve 32 may be referred to as a safety valve or relief valve for the aircraft cabin.

It is an important feature of the air conditioning system that a conduit 36 is connected between the discharge manifold 26 and the reverse flow inlet conduit 14, the connection with the discharge manifold being effected on the upstream side of the pressure regulating valve 30. Obviously, under reverse flow conditions, i.e., when the valve 18 is closed and the valve 20 is open, the air flow to the cabin and electronic compartments is accommodated from the reverse flow inlet conduit 14 through the conduit 36 and the manifold 26 into the electronic compartments 24, 24 and then into the cabin 16. (Reverse flow direction is indicated by the broken arrows in Fig. 1.)

Reverse flow operation is desirable whenever the aircraft cabin is depressurized, as during ground operation with the canopy open or during air operation when battle damage has made it impossible to maintain cabin pressure, and it is also desirable to have reverse flow operation whenever the electronic compartments are insufficiently cooled by air flow in the normal direction. Reverse flow of the cool air supply assures proper cooling of the electronic compartments before the air is discharged into the cabin. Whenever reverse flow operation takes place the pressure regulating valve 30 is to be closed, and the pressure relief valve 32 then functions to control the cabin pressure. Preferably, means responsive to temperature and/or pressure in the electronic compartments 24, 24 and/or in the cabin 16 is provided to operate a valve control system which coordinates the operation of the valves 18 and 20 to select the direction of air flow. The said temperature and/or pressure responsive control means forms no part of the present invention and is not shown. The present invention relates to the valve operating and coordinating system and mechanism which will now be described with particular reference to Fig. 2.

Included in the valve operating and coordinating mechanism is a fluid pressure responsive actuator 40 for the valve 18. The said actuator comprises a housing 42 having a diaphragm-piston 44 disposed therein for movement in one direction responsive to fluid pressure in a chamber 46 within the housing and movable in the other direction responsive to a spring 48 seated within the housing. The diaphragm-piston has a rod 50 connected thereto for reciprocation and which has a motion transmitting connection with a shaft 52 for the valve 18. The arrangement is such that when the diaphragm-piston 44 is moved in the said one direction responsive to fluid pressure in the chamber 46, the valve 18 is rotated with its shaft 52 to a closed position in the normal flow inlet conduit 12. When the diaphragm-piston is moved in the said other direction responsive to the spring 48, the valve 18 is rotated to open the inlet conduit 12.

The fluid pressure chamber 46 in the valve actuator 40 is connected with a source of air under preferably constant pressure by a conduit 54 and through a control valve 56 which will be described in greater detail hereinafter. The source of pressurized air (not shown) will hereinafter be referred to as the servo supply for the valve actuator 40 and for a similar actuator for the normally closed valve 20. It should be observed that a restriction 58 is located in the servo supply conduit 54 for the valve actuator 40 for the purpose of allowing modulation of the actuator pressure in response to the pressure differential across the valve 18.

As mentioned above, a fluid pressure responsive actuator 60 is provided for the normally closed valve 20 and in substantially identical form with the previously described valve actuator 40. Therefore, it will be unnecessary to repeat the description for the actuator 60. However, it should be observed that the actuator 60 is arranged to cause opening movement of the valve 20 responsive to fluid pressure and closing movement thereof responsive to spring force. Like the first described valve actuator, the valve actuator 60 is connectible with a servo supply through the control valve 56 and a conduit 62. However, a double restriction or two restrictions 64, 64 are provided in the contact 62 for a purpose which will be described hereinafter.

The control valve 56 may take various other forms than shown. In the form shown, the control valve 56 includes a ball check 66 which is biased to a position on an armature 68 by a spring 70 whereby to open a port 72 communicating with the servo supply while closing a vent port 73. The port 72 is closed and the vent 73 is opened whenever an electrical coil 74 surrounding the armature 68 is energized. Preferably, the solenoid or coil 74 can be energized by the previously mentioned temperature and/or pressure responsive means which is disposed in the electronic compartments or in the aircraft cabin and, preferably, the solenoid can also be energized by manually operable switch means (not shown) accessible to the pilot. With the arrangement shown, the valve 56 is opened to servo supply by spring force and it is vented only when the solenoid coil 74 is energized. Thus, the valve 18 is opened and the valve 20 is closed for normal flow operation only when the coil 74 is energized.

It will be readily understood that if the direction of air flow is changed suddenly from the normal flow direction to the reverse flow direction when the electronic compartments are warm, the said change in the flow direction would cause rapid cooling of the electronic compartments with the cold air supply admitted directly thereto. This could be the cause of very harmful thermal shock and damage to at least some of the components of the electronic compartments. It will also be understood that thermal shock could as readily occur by changing the direction of flow from reverse to normal. In order to avoid thermal shock in either event, means are provided to coordinate the movement or operation of the valves 18 and 20 so that both will be open for a delayed period during a change in the flow direction, thus avoiding a sudden or abrupt temperature change.

The means performing the aforesaid function comprises the two restrictions 64, 64 in the servo conduit 62 for the actuator 60 operating the valve 20. That is, when the control valve 56 is spring operated to close its vent and to open the system to flow from the servo supply, the double restriction in the conduit 62 will therefore cause a longer time to be taken in the pressure build-up in the valve actuator 60 than will be taken in the pressure build-up in the valve actuator 40 for the valve 18. Thus, the valve 20 will be opened less rapidly than the valve 18 is closed to avoid an abrupt charge or large mass cold air flow directly into the electronic compartments. On the other hand, when the valve 56 is solenoid operated to close the port to the servo supply while venting the system, the double restriction in the conduit 62 will permit the escape of air from the actuator 60 at a more leisurely pace than the escape from the actuator 40. Thus, the valve 18 will be fully open for the flow of air before the valve 20 is fully closed and will avoid an abrupt large change in the mass flow and direction.

Another important feature of the present invention is the provision of means for avoiding undesirable back pressure in the supply and refrigeration system and in the main supply conduit 10 which would be caused by closing the valve 18 before the more slowly moving valve 20 is opened. The means avoiding excessive back pressure comprises the pressure control unit indicated generally by the reference numeral 80. The pressure control 80 comprises a housing 82 for a valve 84 which is reciprocable relative to an orifice 86 in a conduit 88 communicating with the pressure chamber 46 in valve actuator 40. The valve 84 is biased in orifice-closing direction by a spring 90 whereby to increase the valve actuator pressure which tends to close the valve 18. The valve 84 is also urged in the orifice-closing direction by air pressure in a chamber 92 acting upon a diaphragm 94 which is connected with the said valve. The chamber 92 communicates with the aircraft cabin 16 through a conduit 96 whereby the said chamber contains air at cabin pressure. Thus, the greater the cabin pressure the more the tendency of the control unit 80 to effect closing movement of the valve 18 which would increase back pressure in the inlet conduit 12 and supply conduit 10. However, this tendency is opposed by air pressure in a chamber 98 which is defined in the housing 82 between the diaphragm 94 and a diaphragm 100 which is also connected to the reciprocable orifice valve 84. The arrangement is such that pressure in the chamber 98 biases the valve 84 away from the orifice 86 to reduce actuator pressure and thus tending to open the valve 18. The chamber 98 communicates with the inlet conduit 12 and the supply conduit 10 through a passageway 102. Thus, with an increase in back pressure in the inlet conduit 12 and supply conduit 10, the pressure control unit 80 will operate to open the valve 18. In opening the valve 18, there will be a reduction in the back pressure in the supply and inlet conduits 10 and 12.

Since the back pressure in the control unit 80 is opposed by the cabin pressure in the chamber 92 and by the force of the spring 90, it will be obvious that by selection of the spring 90 an election can be made of the pressure differential across the valve 18. Preferably, the spring is selected to have an equivalent of approximately 4 lbs. per sq. in. pressure in the conduit 12. Thus, during reverse flow operation of the system the control unit 80 will operate to position the valve 18 whether fully closed or partially open to maintain approximately a 4 lbs. per sq. in. difference in the pressure between the supply conduits and the cabin. This, of course, means that during reverse flow operation the air will flow from the electronic compartments 24, 24 into the cabin 16 under 4 lbs. pressure or at any other pressure selected and set up in the pressure control unit 80.

The invention claimed is:

1. In an air conditioning system for an aircraft compartment having a first and a second inlet connected with a conditioned air supply, a first and a second valve disposed in the respective inlets for opening and closing the same, a pair of fluid pressure responsive actuators respectively connected with the said valves each of which actuators has a pressure chamber, one of the said actuators being connected with the first valve to cause closing and opening movement thereof responsive to pressure increase and decrease, respectively, in its chamber and the other of said actuators being connected with the second valve to cause opening and closing movement thereof responsive to pressure increase and decrease, respectively, in its chamber, a control valve connectible with a source of fluid under pressure, first and second conduit means respectively connected with the chambers of said actuators and connected with said control valve, the control valve being adapted selectively to connect the said chambers with a source of fluid under pressure or to vent said chambers simultaneously, and flow limiting means in one of the said conduit means whereby to cause the rate of opening and closing movement of the second valve to be less than the rate of closing and opening movement of the first valve.

2. In an air conditioning system adapted to supply a plurality of aircraft compartments for series connected flow therethrough and wherein the compartments at each end of the series are connected with a conditioned air supply through a first and a second inlet respectively, the combination comprising a first and a second valve disposed in the respective inlets for opening and closing the same, a pair of fluid pressure responsive actuators respectively connected with the said valves each of which actuators has a pressure chamber, the first of said actuators being connected with the first valve to cause closing and opening movements thereof responsive to pressure increase and decrease, respectively, in its chamber and the second of said actuators being connected with the second valve to cause opening and closing movements thereof responsive to pressure increase and decrease, respectively, in its chamber, a control valve connectible with a source of fluid under pressure, first and second conduit means respectively connected with the chambers of said actuators and connected with said control valve, the control valve being adapted selectively to connect the said chambers with a source of fluid under pressure or to vent said chambers simultaneously, and flow limiting means in each of said conduit means to avoid abrupt substantial changes in pressure in the respective chambers, the flow limiting means in the second conduit means causing a greater restriction to flow therein than in the first conduit means whereby to cause the rate of opening and closing movements of the second valve to be less than the rate of closing and opening movements of the first valve.

3. In an air conditioning system for a plurality of aircraft compartments which are connected in series for flow therethrough, the combination comprising a first inlet conduit having a first valve therein and connected with one of the compartments and a second inlet conduit having a second valve therein and connected with another compartment each of which conduits is connected with a conditioned air supply, a pair of fluid pressure responsive actuators respectively connected with the said valves each of which actuators has a pressure chamber, the first of said actuators being connected with the first valve to cause closing and opening movement thereof responsive to pressure increase and decrease, respectively, in its chamber and the second of said actuators being connected with the second valve to cause opening and closing movement thereof responsive to pressure increase and decrease, respectively, in its chamber, control means for simultaneously increasing and decreasing the fluid pressure in said actuator chambers, and means for controlling back pressure in said conduits and said air supply comprising orifice-defining means for the first actuator chamber and a valve controlling said orifice, said orifice valve being biased toward open position by pressure in said first conduit to open said first valve and being biased toward closed position by pressure in said one compartment to close said first valve, and spring means biasing said orifice valve toward closed position.

4. In an air conditioning system for a plurality of aircraft compartments which are connected in series for flow therethrough, the combination comprising a first inlet conduit having a first valve therein and connected with one of the compartments and a second inlet conduit having a second valve therein and connected with another compartment, each of which conduits is connected with a conditioned air supply, a pair of fluid pressure responsive actuators respectively connected with the said valves each of which actuators has a pressure chamber, the first of said actuators being connected with the first valve to cause closing and opening movements thereof responsive to pressure increase and decrease, respectively, in its chamber and the second of said actuators being connected with the second valve to cause opening and closing movements thereof responsive to pressure increase and decrease, respectively, in its chamber, a control valve connectible with a source of fluid under pressure, first and second conduit means respectively connected with the chambers of the said first and second actuators and connected with said control valve, the control valve being adapted selectively to connect the said chambers with a source of fluid under pressure or to vent said chambers simultaneously, and means for controlling back pressure in said inlet conduits and said air supply comprising orifice-defining means for the first actuator chamber and a valve controlling said orifice, said orifice valve being biased toward open position by pressure in said first conduit to open said first valve and being biased toward closed position by pressure in said one compartment to close said first valve, and spring means biasing said orifice valve toward closed position.

5. In an air conditioning system for a plurality of aircraft compartments which are connected in series for flow therethrough, the combination comprising a first inlet conduit having a first valve therein and connected with one of the compartments and a second inlet conduit having a second valve therein and connected with another compartment, each of which conduits is connected with a conditioned air supply, a pair of fluid pressure responsive actuators respectively connected with the said valves each of which actuators has a pressure chamber, the first of said actuators being connected with the first valve to cause closing and opening movements thereof responsive to pressure increase and decrease, respectively, in its chamber and the second of said actuators being connected with the second valve to cause opening and closing movements thereof responsive to pressure increase and decrease, respectively, in its chamber, a control valve connectible with a source of fluid under pressure, first and second conduit means respectively connected with the chambers of the said first and second actuators and connected with said control valve, the control valve being adapted selectively to connect the said chambers with a source of fluid under pressure or to vent said chambers simultaneously, flow limiting means in said second conduit means to cause the rate of opening and closing movements of the second valve to be less than the rate of closing and opening movements of the first valve, and means for controlling back pressure in said inlet conduits and said air supply comprising orifice-defining means for the first actuator chamber and a valve controlling said orifice, said orifice valve being biased toward open position by pressure in said first inlet conduit to open said first valve and being biased toward closed position by pressure in said one compartment to close said first valve, and spring means biasing said orifice valve toward closed position.

6. In an air conditioning system for a plurality of aircraft compartments which are connected in series for flow therethrough, the combination comprising a first inlet conduit having a first valve therein and connected with one of the compartments and a second inlet conduit having a second valve therein and connected with another compartment, each of which conduits is connected with a conditioned air supply, a pair of fluid pressure responsive actuators respectively connected with the said valves each of which actuators has a pressure chamber, the first of said actuators being connected with the first valve to cause closing and opening movements thereof responsive to pressure increase and decrease, respectively, in its chamber and the second of said actuators being connected with the second valve to cause opening and closing movements thereof responsive to pressure increase and decrease, respectively, in its chamber, a control valve connectible with a source of fluid under pressure, first and second conduit means respectively connected with the chambers of the said first and second actuators and connected with said control valve, the control valve being adapted selectively to connect the said chambers with a source of fluid under pressure or to vent said chambers simultaneously, flow limiting means in each of said conduit means to avoid abrupt substantial changes in pressure in the respective chambers, the flow limiting means in the second conduit means causing a greater restriction to flow therein than in the first conduit means whereby to cause the rate of opening and closing movements of the second valve to be less than the rate of closing and opening movements of the first valve, and means for controlling back pressure in said inlet conduits and said air supply comprising orifice-defining means for the first actuator chamber and a valve controlling said orifice, said orifice valve being biased toward open position by pressure in said first inlet conduit to open said first valve and being biased toward closed position by pressure in said one compartment to close said first valve, and spring means biasing said orifice valve toward closed position.

References Cited in the file of this patent

UNITED STATES PATENTS

| | | |
|---|---|---|
| 2,002,057 | Gregg | May 21, 1935 |
| 2,773,440 | Arthur | Dec. 11, 1956 |
| 2,814,241 | Silver | Nov. 26, 1957 |